United States Patent
Fukuda et al.

[11] Patent Number: 5,387,938
[45] Date of Patent: Feb. 7, 1995

[54] ADAPTIVE INTERFRAME/INTRAFRAME BLOCK CODING METHOD AND APPARATUS

[75] Inventors: Hideki Fukuda, Kadoma; Masahiro Honjo, Sakai; Ren Egawa, Kadoma, all of Japan

[73] Assignee: Matsushita Electric Industrial Co., Ltd., Osaka, Japan

[21] Appl. No.: 160,368

[22] Filed: Dec. 2, 1993

[30] Foreign Application Priority Data

Oct. 9, 1991 [JP] Japan .................... 03-261719
Jan. 22, 1992 [JP] Japan .................... 04-8977
Jan. 22, 1992 [JP] Japan .................... 04-8976

Related U.S. Application Data

[63] Continuation-in-part of Ser. No. 957,788, Oct. 8, 1992, abandoned.

[51] Int. Cl.⁶ .............................................. H04N 7/13
[52] U.S. Cl. .................................................. 348/420
[58] Field of Search ................ 388/136; 358/133, 105; 348/420, 421, 415, 409, 416, 390, 384

[56] References Cited

U.S. PATENT DOCUMENTS

| | | | |
|---|---|---|---|
| 4,802,006 | 1/1989 | Iinuma et al. | 358/136 |
| 4,837,618 | 6/1989 | Hatori et al. | 358/136 |
| 4,862,264 | 8/1989 | Wells et al. | 358/136 |
| 4,932,066 | 6/1990 | Nakayama et al. | 348/409 |
| 4,942,465 | 7/1990 | Ohta | 358/136 |
| 4,947,248 | 8/1990 | Hienerwadel et al. | 358/136 |
| 5,040,060 | 8/1991 | Owada et al. | 358/136 |
| 5,260,782 | 11/1993 | Hui | 348/409 |

Primary Examiner—Tommy P. Chin
Assistant Examiner—Bryan S. Tung
Attorney, Agent, or Firm—Wenderoth, Lind & Ponack

[57] ABSTRACT

In an image coding method, a picture is divided into blocks composed of adjacent plural pixels, and a reference picture is used to predict the picture to be coded. A block including an image region not existing in the reference picture, i.e. newly appearing in the picture to be coded by the movement of an object included in the picture, is detected as an independent block, and the independent block is coded independently, without prediction from the reference picture.

10 Claims, 15 Drawing Sheets

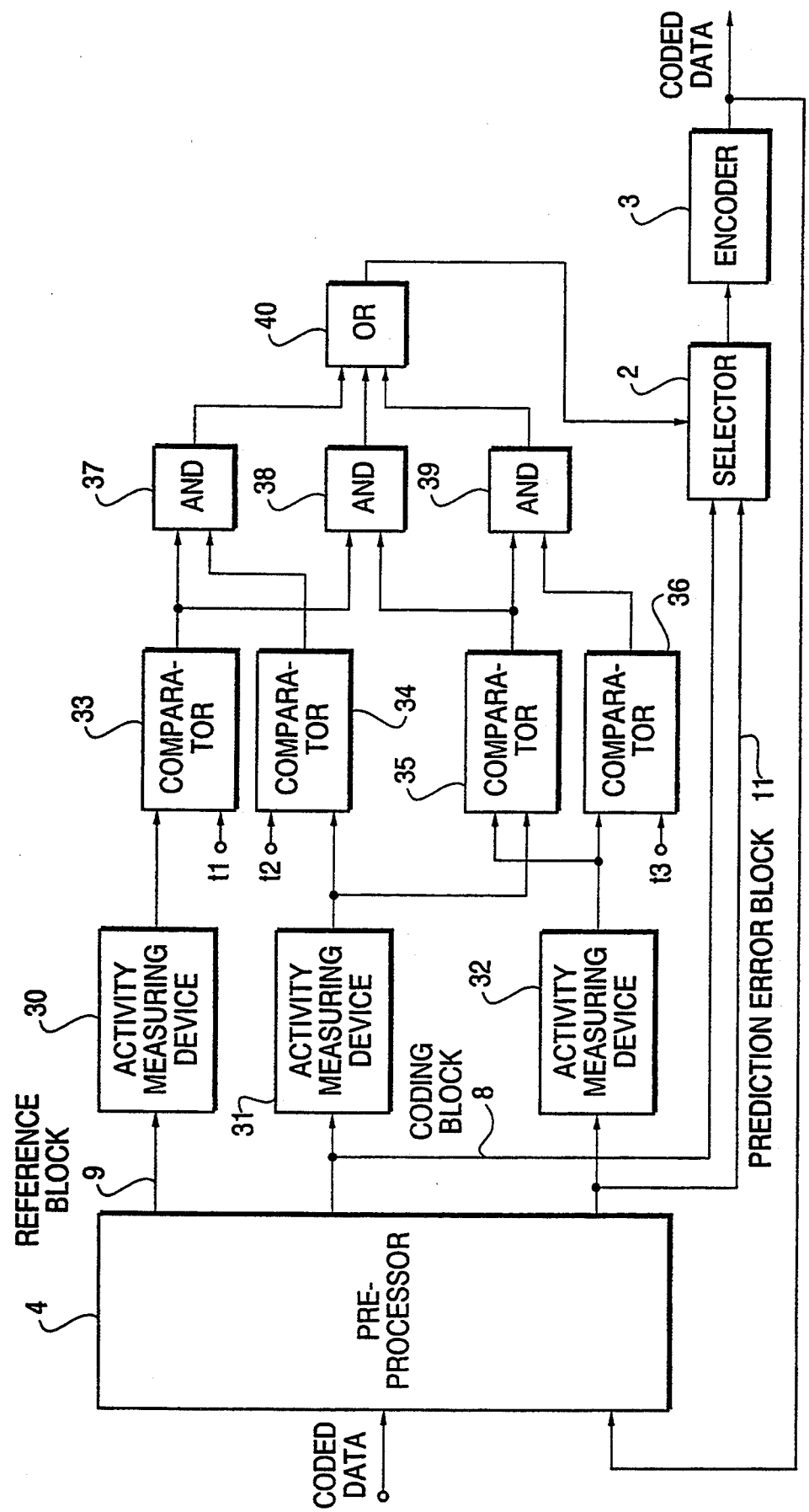

WHEN ACTIVITY OF REFERENCE BLOCK > t1

ACTIVITY OF PREDICTION ERROR BLOCK

WHEN ACTIVITY OF REFERENCE BLOCK ≤ t1

ACTIVITY OF PREDICTION ERROR BLOCK

ADAPTIVE INTERFRAME/INTRAFRAME BLOCK CODING METHOD AND APPARATUS

This is a continuation-in-part of now abandoned application Ser. No. 07/957,788, filed Oct. 8, 1992, now abandoned.

BACKGROUND OF THE INVENTION

1. Field of the Invention

The present invention relates to an image coding method and an image coding apparatus used for transmitting or recording digital images by compressing and coding.

2. Description of the Prior Art

As a coding method of digital images, hitherto, a method is known to divide an image into blocks composed of adjacent plural pixels, predicting the present image using the image before or after the object image in time as a reference image, and coding the prediction error in each block. In this method, the activity of the pixel level of the block to be coded and the activity of the prediction error block are compared, and it is selected whether to directly code the pixel level of the block to be coded or to code the prediction error.

In such a conventional coding method, a residue noise of a moving object is generated, which results in deterioration of picture quality. This is because a part of an image not existing in the reference image appears newly by the movement of the object within the image, and it is difficult to predict such a region from the reference image, and moreover the coding noise increases to become a residue noise. In particular, the residue noise occurring in a region having pixel level activity of the image is significant, which gives rise to excessive deterioration of picture quality.

SUMMARY OF THE INVENTION

It is hence a primary object of the invention to present an image coding method and an image coding apparatus capable of removing the residue noise of a moving object and realizing image coding of high efficiency.

To achieve the object, the invention presents an image coding method for dividing an image into blocks each composed of adjacent plural pixels, predicting an image to be coded by using a reference image, and coding the image on a block by block basis, wherein a block newly appearing in the image to be coded and including an image region not existing in the reference image Is detected as an independent block, and the independent block is coded independently, regardless of the reference image.

An image coding apparatus of the invention for realizing the above image coding method comprises an independent block detector for detecting a block appearing in the image to be coded and including an image region not-existing in a reference image as an independent block, and means for independently coding, regardless of the reference image, the independent block detected by the independent block detector.

In such constitution, an image region not existing in the reference image produced by a movement of an object within the image is detected, and the detected image region is coded independently of the reference image. Therefore the residue noise of the moving object is removed, so that the image quality may be enhanced.

BRIEF DESCRIPTION OF THE DRAWINGS

FIG. 7 is a block diagram of a fourth embodiment of an image coding apparatus of the invention.

DESCRIPTION OF THE PREFERRED EMBODIMENTS

The explanation below is directed to the processing of an image in frame units, dividing each frame into blocks composed of adjacent plural pixels, and coding in each block. The description below is also directed to a method of detecting motion by using a reference frame, predicting the block to be coded by the prediction signal block obtained by motion compensation in each block from the reproduced frame of the reference frame already decoded, and coding the prediction error signal in each block.

Figure 1:
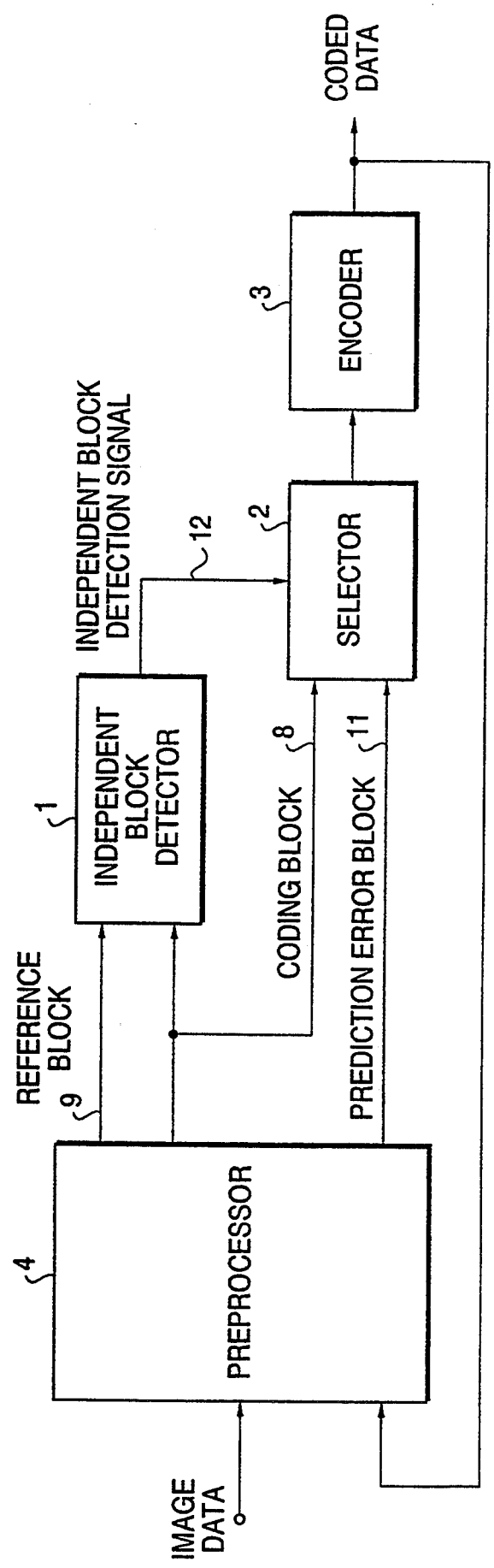
FIG. 1 is a block diagram of a first embodiment of an image coding apparatus of the invention.
Figure 2:
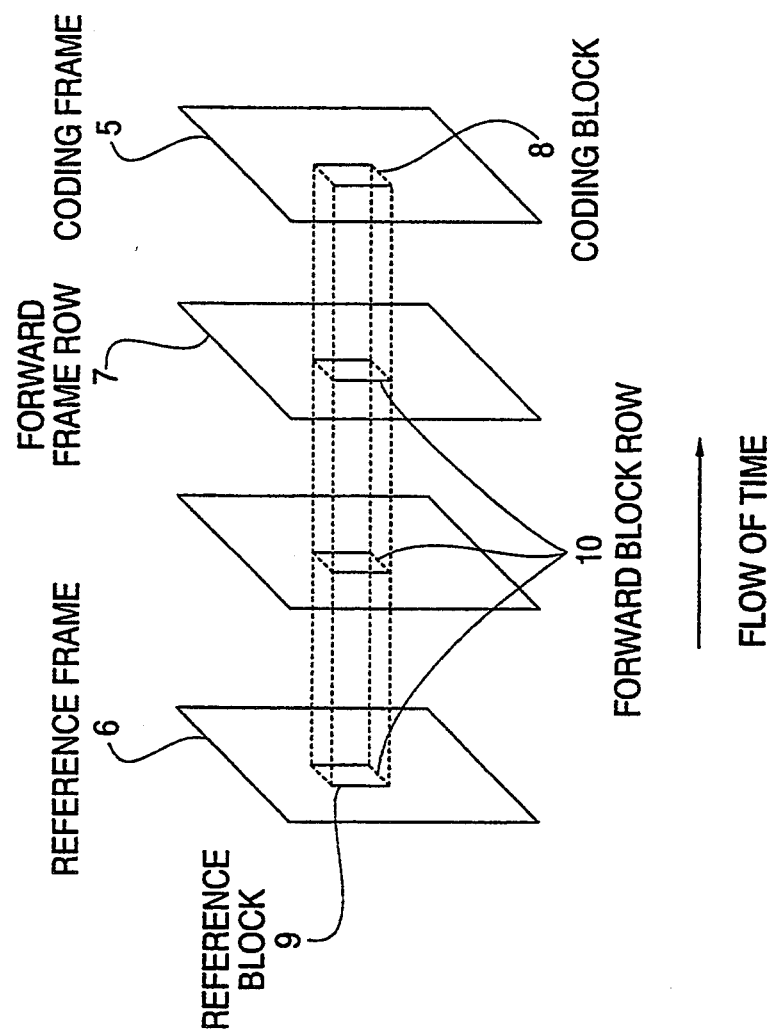
FIG. 2 is an explanatory diagram of a time configuration of a coding frame and reference frame.
Figure 3:
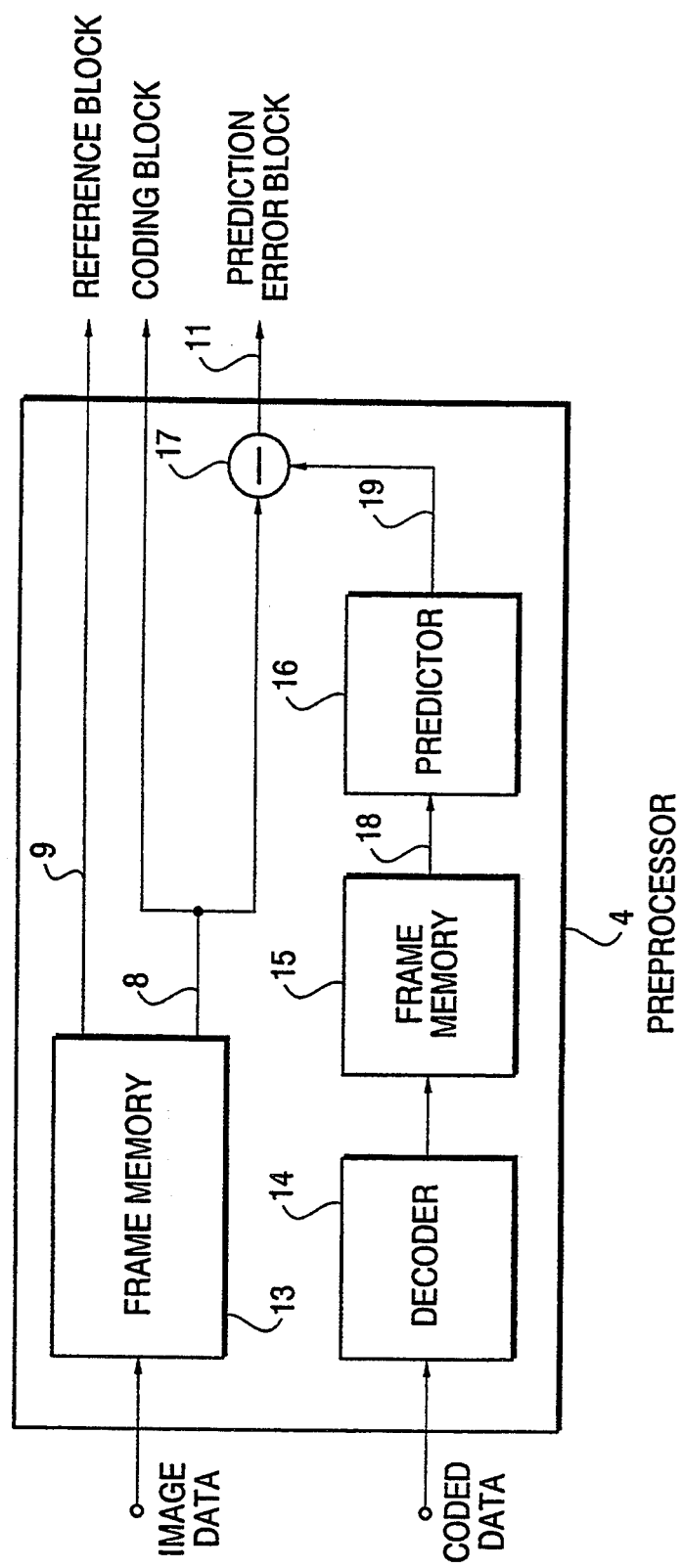
FIG. 3 is a block diagram of an example of a preprocessor in the first embodiment of the image coding apparatus of the invention.

FIG. 1 shows a block diagram of a first embodiment of an image coding apparatus of the invention. FIG. 2 shows an example of a time configuration of coding frame 5, reference frame 6, coding block 8 and reference block 9. In FIG. 2, the reference block 9 is a block within the reference frame located in the coding block 8 in the coding frame 5. FIG. 3 Shows an example of block diagram of a preprocessor 4 in FIG. 1. In FIG. 3, image data enters a first frame memory 13 and is accumulated. Of the accumulated frames, the pixel signals in the coding frame 5 and reference frame 6 are delivered in each block, thereby obtaining coding block 8 and reference block 9. A decoder 14 processes coded data and obtains a reproduction frame. A second frame memory 15 delivers a reproduction frame 18 of reference frame 6, out of the reproduction frames obtained by the decoder 14. A predictor 16 finds and delivers a prediction signal row 19 of the coding block 9 in the reproduction frame 18 of the reference frame 6. A subtractor 17 subtracts the pixel signal row of the coding block 8 by the prediction signal row 19, and obtains a prediction error block 11. The constitution of the preprocessor 4 is not limited to the one shown in FIG. 3, but, for example, the reference block 9 may be formed as a block in the reproduction frame obtained by coding the reference frame. This is because the difference between the reproduction frame and original frame is small.

In FIG. 1, first of all, image data is entered in the preprocessor 4, in which coding block 8, reference block 9, and prediction error block 11 are determined. The pixel signal row in the obtained reference block 9 and the pixel signal row in the coding block 8 are fed into an independent block detector 1. The independent block detector 1 detects if the coding block 8 is an independent block indifferent to the reference frame 6 or not, and produces an independent block detection signal 12 as the result of detection. The independent block signal 12 is 1 when the coding block 8 is an independent block, and is 0 when not an independent block. When the independent block signal 12 is 1, a selector 2 selects and produces the coding block 8 out of the coding block 8 and prediction error block 11, and the coding block 8 is fed into an encoder 3, so that intra-frame coding is done independently of the reference frame 6. On the other hand, when the independent block detection signal 12 is 0, the selector 2 selects and produces the prediction error block 11, and the prediction error block 11 is fed into the encoder 3, and inter-frame prediction coding is effected. In this way, by detecting whether independent of or dependent of the reference frame 6 by the independent block detector 1, intra-frame coding or inter-frame prediction coding is conducted appropriately, so that the residue noise of the moving object may be eliminated, thereby improving the picture quality.

The encoder 3 is to encode the input signal row, whether by discrete cosine transform (DCT), or by vector coding or some other technique.

Figure 4:
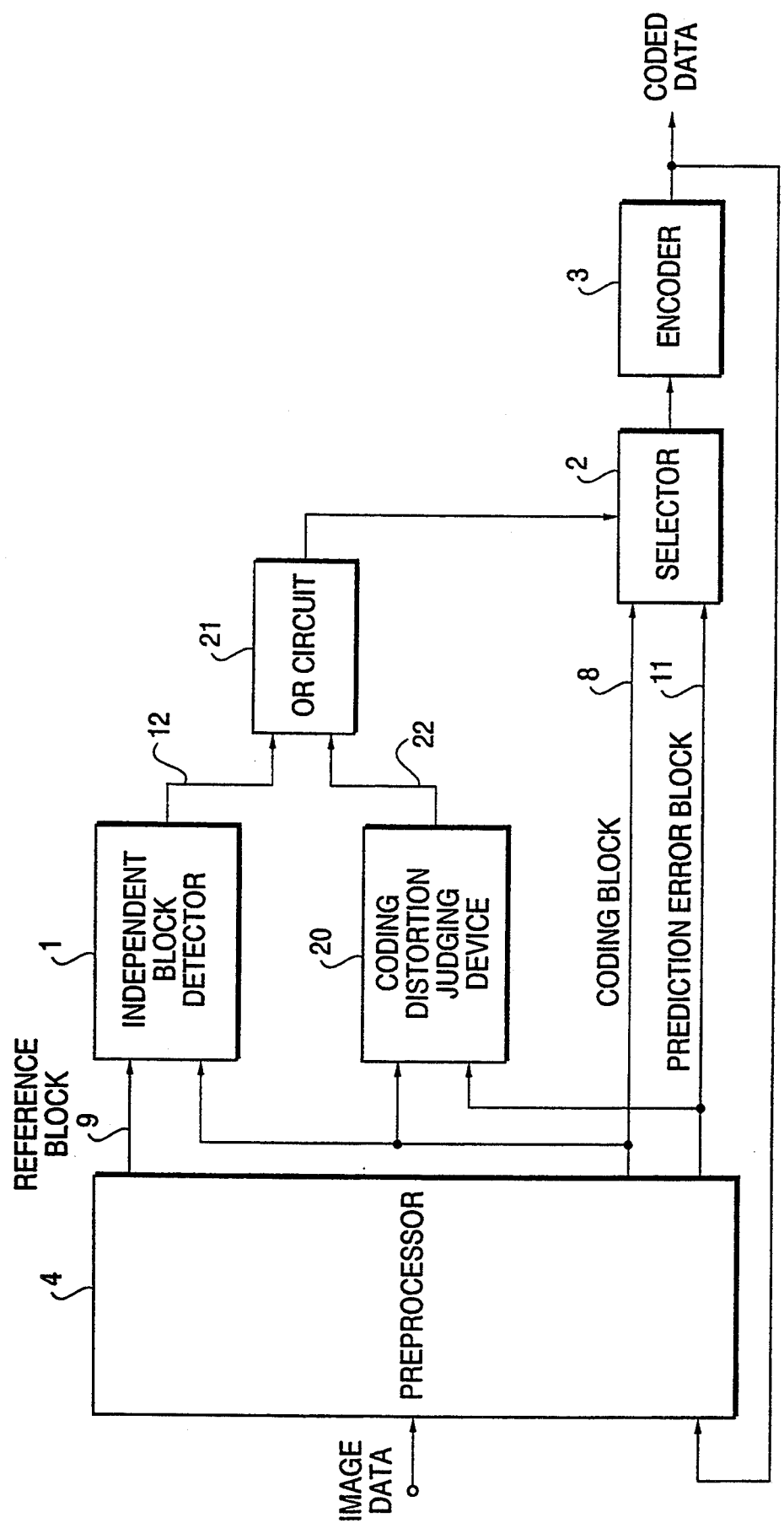
FIG. 4 is a block diagram of a second embodiment of an image coding apparatus of the invention.

FIG. 4 shows a block diagram of a second embodiment of an image coding apparatus of the invention. In FIG. 4, the preprocessor 4 is the same as shown in FIG. 3 and receives image data, and sends out coding block 8, reference block 9, and prediction error block 11. A coding distortion judging device 20 in FIG. 4 detects which one of the coding block 8 and prediction error block 1 may be coded with a smaller coding distortion in a specified code quantity, and delivers a distortion judgement detection signal 22 as the result of detection. The distortion judgement detection signal 22 is 1 when the coding distortion is smaller when coding the coding block 8 than when coding the prediction error block 11, and is 0 when the coding distortion is smaller when coding the prediction error block 11. The independent block detection signal 12 is same as in FIG. 1, and is 1 when the coding block 8 is an independent block, and is 0 when not an independent block. An OR circuit 21 determines the OR of the independent block detection signal 12 and distortion judgement detection signal 22. When the output of the OR circuit 21 is 1, the selector 2 selects and outputs the coding block 8 out of the coding block and prediction error block 11. In this case, the coding block 8 is fed into the encoder 1, and intra-frame coding is effected. On the other hand, when the output of the OR circuit 21 is 0, the selector 2 delivers the prediction error block 11, which is fed into the encoder 3 to effect inter-frame predictive coding. In the coding apparatus in FIG. 4, the coding block 8 is subjected to intra-frame coding only when the coding block 8 is recognized to be an independent block by the independent block detector 1, or when the coding distortion judging device 20 recognizes that the coding distortion is smaller when coding the coding block 8 than when coding the prediction error block 11.

Figure 5:
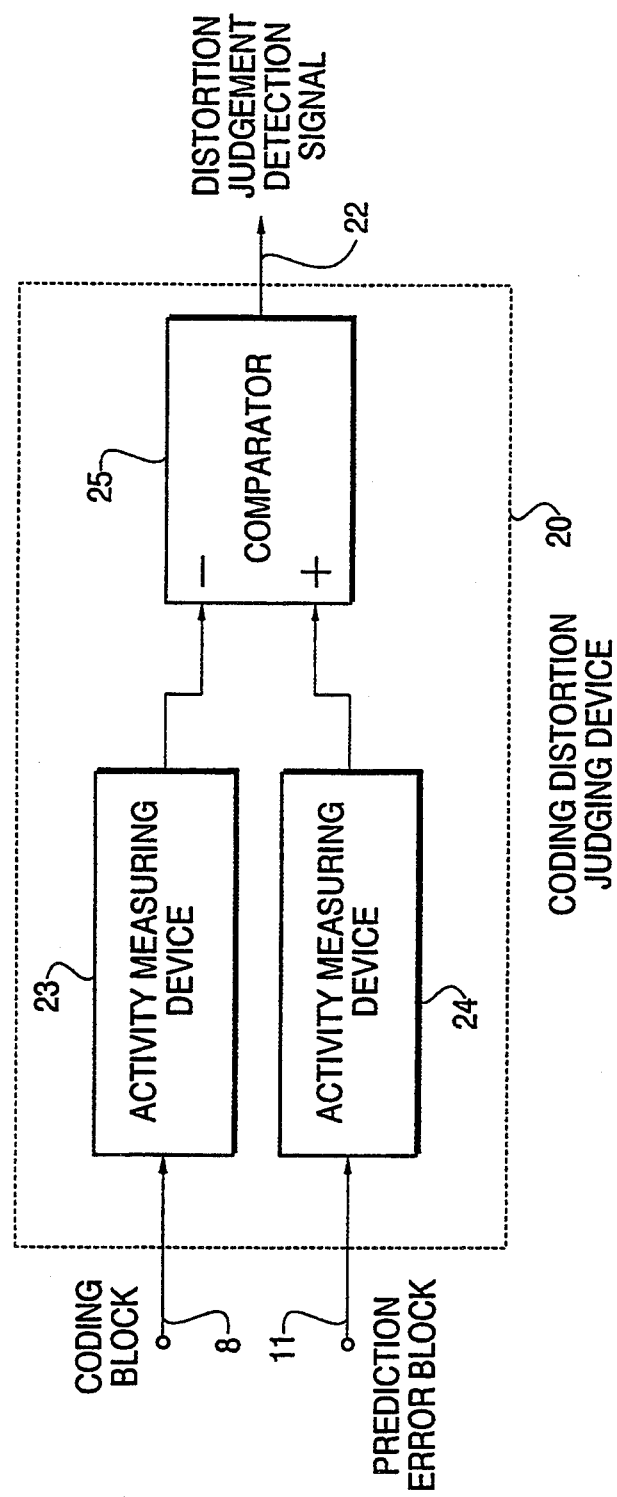
FIG. 5 is a block diagram of an example of a coding distortion judging device for detecting a signal row obtaining a minimum coding distortion in a specified code quantity in the second embodiment.

FIG. 5 shows an example of the coding distortion judging device 20. The coding distortion Judging device 20 in FIG. 5 measures the activities of the coding block 8 and prediction error block 11 by activity measuring devices 23, 24, respectively. A comparator 25 compares the measured activity of the coding block 8 and activity of the prediction error block 11, and the result of comparison is delivered as distortion judgement detection signal 22. The distortion judgement detection signal 22 is 1 when the activity of the prediction error block 11 is greater than the activity of the coding block 8, and is 0 when the activity of the coding block 8 is greater. The coding distortion judging device 20 recognizes that the coding distortion is greater when the activity is greater.

The constitution of the coding distortion judging device 20 is not limited to the one shown in FIG. 5, but is not particularly defined as far as a small coding distortion can be judged by a specified code quantity. For example, when discrete cosine transform (DCT) is effected in coding, by performing intra-frame coding, the code quantity required for coding the DC component of DCT coefficient increases, and the coding efficiency may be lowered. To prevent this, when the activity is small, inter-frame predictive coding may be effected.

As the activity of a block, meanwhile, the variance of the pixel signal row within block may be used, or the sum of absolute values of difference of the means of the pixel signal row in the block and pixel signal row may be used, or the entropy of the pixel signal row in the block may be also used, or anything else may be used that can be handled as the activity of the pixel signal row in a block. The variance of a block may be determined in the following equation, supposing the number of pixels contained in one block to be N, and pixel vectors of individual pixels to be x1, x2, - - - , xn.

$$\text{Variance} = \frac{1}{N} \sum_{i=1}^{N} (xi - m)^2$$

$$\text{where } m = \frac{1}{N} \sum_{i=1}^{N} xi$$

Figure 6:
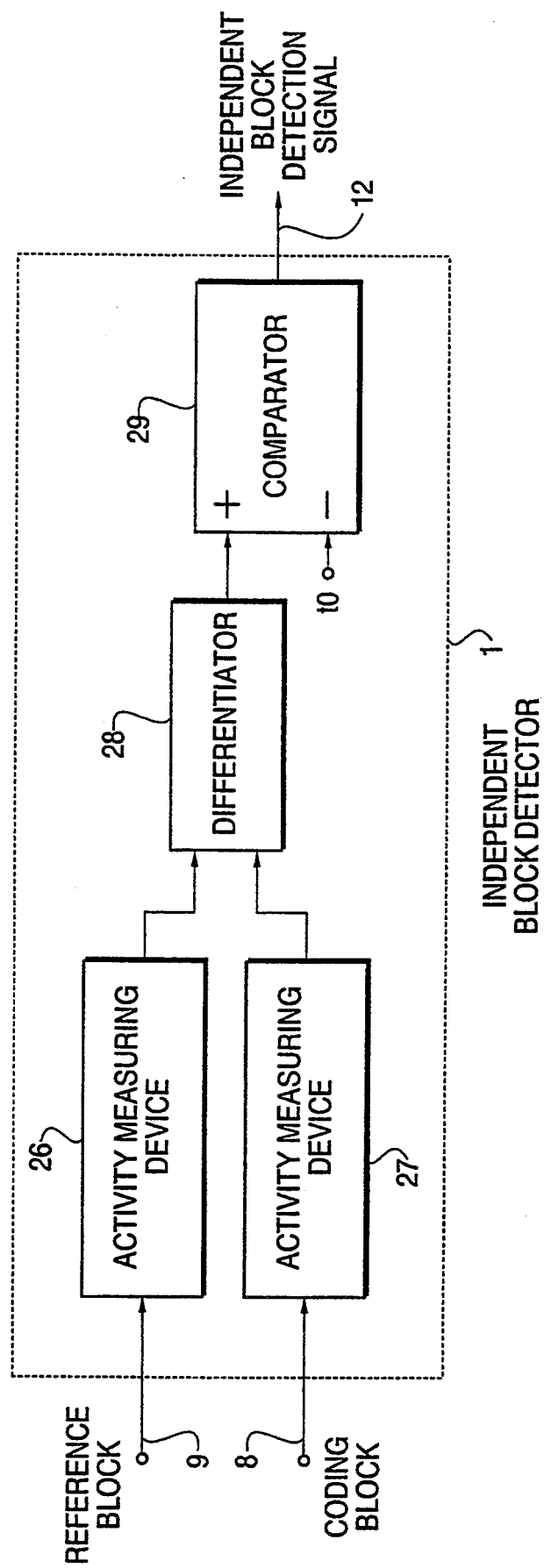
FIG. 6 is a block diagram of an independent block detector in a third embodiment of an image coding apparatus of the invention.

FIG. 6 is a block diagram of an example of the independent block detector 1 in FIG. 1 or FIG. 4, as a third embodiment of the coding apparatus of the invention. In FIG. 6, the reference block 9 is a block in the reference frame 6 at the position of the coding block 8 in the coding frame.

In the first place, the activity of the reference block 9 and the activity of the coding block 8 are measured by activity measuring devices 26, 27, respectively. The difference between the activity of the reference block 9 and the activity of the coding block 8 is determined in a differentiator 28. A comparator 29 compares the output of the differentiator 28 with the required quantity t0, and produces an independent block detection signal 12 as result of comparison. The independent block detection signal 12 is 1 when the difference of the activities is greater than t0, and the coding block 8 is recognized to be an independent block. On the other hand, when the difference of the activities is less than t0, the independent block detection signal 12 is 0. When the independent block detection signal 12 is 1, the selector 2 in FIG. 1 or FIG. 4 delivers the coding block 8, and intra-frame coding is effected by the encoder 3.

The activity measuring devices 26, 27 may be the same as the activity measuring devices 23, 24 in FIG. 5, and as the activity of the block, meanwhile, the variance of the pixel signal row in the block may be used, or the sum of absolute values of differences between the mean of the pixel signal row in the block and the pixel signal row may be used, or the entropy of the pixel signal row in the block may be also used, or any other method may be used that expresses the activity of the pixel signal row in the block.

The required quantity t0 is, for example, about 500 supposing the pixel level to be 256 gradations and using the variance of pixel signal row in block as the activity of block. This is because the variance of the block having a small change of the pixel level exceeds 500. However, the value of t0 is not limited to this value alone, but may be properly changed depending on the image, so that an efficient coding may be effected.

By thus performing intra-frame coding appropriately, the residue image of the moving object may be removed, and the image quality may be improved.

FIG. 7 is a block diagram of a fourth embodiment of an image coding apparatus of the invention. In FIG. 7, the preprocessor 4, which is that same as that shown in FIG. 3, receives image data and outputs coding block 8, reference block 9, and prediction error block 11. Activity measuring devices 30, 31, and 32 respectively measure and produce the activities of the reference block 9, coding block 8, and prediction error block 11. A comparator 33 compares the activity of the reference block 9 with the required quantity t1, and produces 1 when the activity of the reference block 9 is greater than the required quantity t1, and produces 0 when smaller than the required quantity t1. A comparator 34 compares the activity of the coding block 8 with the required quantity t2, and produces 1 when the activity of the coding block 8 is smaller than the required quantity t2, and produces 0 when greater than the required quantity t2. The output signal of the comparator 33 and the output signal of the comparator 34 are fed into an AND circuit 37, and the AND circuit 37 calculates and outputs an AND of the two input signals. Therefore, it is when the activity of the reference block 9 is greater than the required quantity t1 and the activity of the coding block 8 is smaller than the required quantity t2 that the output signal of the AND circuit 37 becomes 1.

A comparator 35 compares the activity of the coding block 8 with the activity of the prediction error block 11. The output signal of the comparator 35 is 1 when the activity of the coding block 8 is smaller than the activity of the prediction error block 11, and is 0 when greater than the activity of the prediction error block 11. A comparator 36 compares the activity of the prediction error block with the required quantity t3. The output signal of the comparator 36 is 1 when the activity of the prediction error block 11 is greater than the required quantity t3, and 0 when smaller than the required quantity t3. The output signal of the comparator 35 and the output signal of the comparator 36 are fed into an AND circuit 39, and the AND circuit 39 calculates and outputs an AND of the two input signals. The output signal of the AND circuit 39 corresponds to the distortion judgement detection signal 22 in FIG. 4, and the output signal of the AND circuit 39 is 1 when it is recognized that the coding distortion is smaller when the coding block 8 is coded by the encoder 3 to perform intra-frame coding than when the prediction error block 11 is coded to perform inter-frame predictive coding. On the other hand, the output signal of the AND circuit 39 is 0 when it is recognized that the coding distortion is greater by intra-frame coding. The method of judging the coding distortion is to recognize that the specified coding distortion is smaller in the block of the smaller activity. However, when performing DCT coding in the encoder 3, since the code quantity required for coding of the DC component of DCT increases in intra-frame coding, the coding efficiency may be lowered if the intra-frame coding is selected only by the output of the comparator 35. To prevent such lowering of coding efficiency, the prediction error block 11 is compared with the required quantity t3 in the comparator 36, and when the activity of the prediction error block 11 is less than the required quantity t3, it is recognized that the coding distortion may be smaller when inter-frame predictive coding is effected regardless of the output signal of the comparator 35. Therefore, it is when the activity of the prediction error block 11 is larger than the required quantity t3 and smaller than the activity of the coding block 8 that it is recognized that the coding distortion is smaller at the specified code quantity by intra-frame coding than by inter-frame predictive coding.

The AND circuit 38 is to calculate and produce an AND of the output signal of comparator 33 and output signal of comparator 35. When the activity of the reference block 9 is greater than the required quantity t1, regardless of the magnitude of the activity of the prediction error block 11, if the activity of the coding block 8 is smaller than the activity of the prediction error block 11, the intra-frame coding is selected, and in this case the output signal of the AND circuit 38 is 1.

An OR circuit 40 calculates and produces an OR of the output signals of the AND circuits 37, 38, 39. The selector 2 selects and produces either one of the coding block 8 and prediction error block 11 depending on the output signal of the OR circuit 40, and the selected block is fed into the encoder 3 to be coded. When the output signal of the OR circuit 40 is 1, the coding block 8 is selected by the selector 2, and intra-frame coding is effected in the encoder 3. On the other hand, when the output signal of the OR circuit 40 is 0, the prediction error block 11 is selected, and inter-frame predictive coding is effected.

Activity measuring devices 30 to 32 may be same as the activity measuring devices 23, 24 in FIG. 5, and as the activity of the block, the variance of the pixel signal row in the block may be used, or the sum of the absolute values of differences between the mean of pixel signal row in the block and the pixel signal row may be used, or the entropy of the pixel signal row in the block may be also used, or any other method may be used that expresses the activity of the pixel signal row in the block.

Figure 8A:
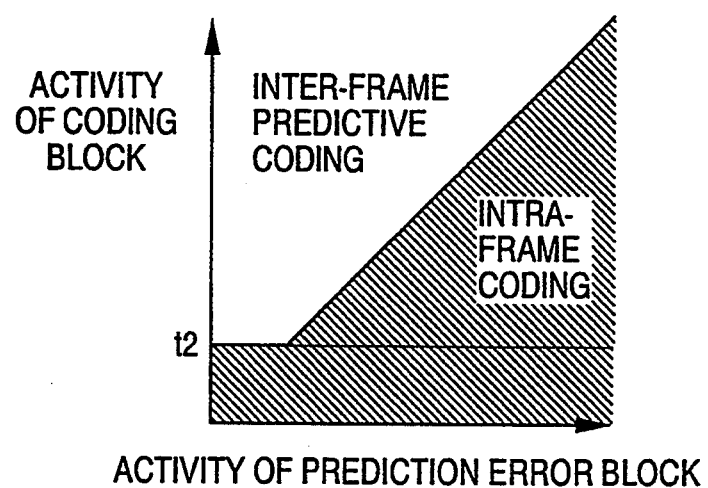
FIGS. 8(A) and 8(B) are explanatory diagrams showing a region for selecting inter-frame predictive coding or intra-frame coding in the fourth embodiment of the invention.
Figure 8B:
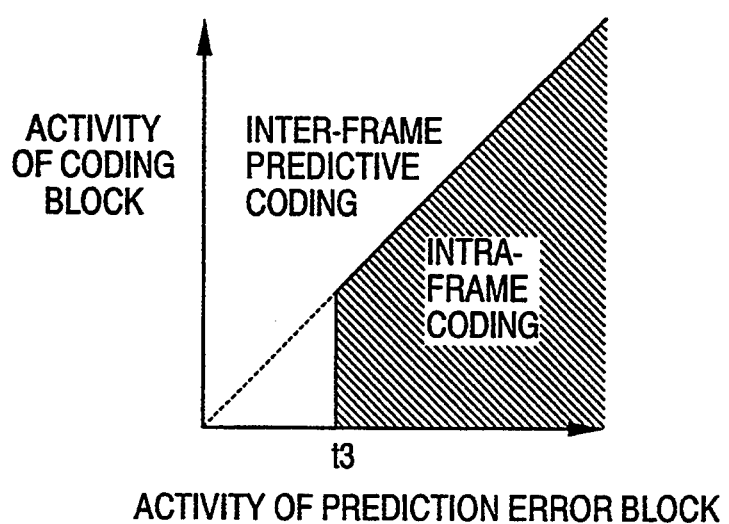

FIG. 8 represents the condition of selecting the intra-frame coding and inter-frame predictive coding in the fourth embodiment in FIG. 7. The condition for selecting the intra-frame coding when the activity of the reference block 9 is greater than the required quantity t1 is, as shown in FIG. 8 (A), that the activity of the coding block 8 is smaller than the required quantity t2, or that the activity of the coding block 8 is smaller than the activity of the prediction error block 11. The condition for selecting the intra-frame coding when the activity of the reference block 9 is smaller than the required quantity t1 is, as shown in FIG. 8 (B), that the activity of the prediction error block 11 is greater than the required quantity t3 and that the activity of the coding block 8 is smaller than the activity of the prediction error block 11.

That the activity of the block is great means a complicated pattern or the contour of a certain pattern, and a large change in the activity between frames means that the object in the image is moved. When the image region large in the activity in the reference frame 6 is changed to an image region of small activity in the coding frame 5, it is recognized that a flat pattern has appeared as a result of the movement of the object. When inter-frame predictive coding is effected in such a region, a residue noise apparent to the human eye is likely to occur. Therefore, by performing intra-frame coding in the region large in the activity of the reference block 9 and small in the activity of the coding block 8, the residue noise is eliminated, and the picture quality may be improved. Further, by comparing the activities of the coding block 8 and prediction error block 11, either one smaller in the coding distortion at a specified code quantity is selected, and either intra-frame coding or inter-frame prediction coding is effected, so that coding may be done efficiently.

The required quantities t1, t2, t3 in the coding apparatus in the fourth embodiment in FIG. 7 should be properly about 500, 30, and 1,000 respectively, supposing the pixel level to be 256 gradations, and determining the variance of pixel level in the block as the activity of block. This is because the variance of a flat block with a small activity is 30 or less and the variance of a complicated block with a large activity is over 500. These are not, however, limitative, and efficient coding is effected by adaptively varying these numbers depending on the image.

So far, the independent block has been detected by investigating the activities of the reference block 9 and coding block 8. As an other method, however, if there are an arbitrary number of frames in terms of time between the reference frame 6 and coding frame 5, the same manner as in the foregoing embodiments may be done, or by investigating also the activity of the block in the frame positioned between the coding frame 5 and reference frame 6, an independent block may be detected. In this case, as shown in FIG. 2, when the reference frame is positioned before the coding frame 5 in time, the frame row positioned before the coding frame 5 up to the reference frame 6 is called a forward frame row 7. Within each block of the forward frame 7, the block positioned at the coding block 10 in the coding frame 5 is called a forward block row 10. By investigating the activity of the forward block row 10 and the activity of the coding block 8, the independent block is detected, of which method is explained below.

Figure 9:
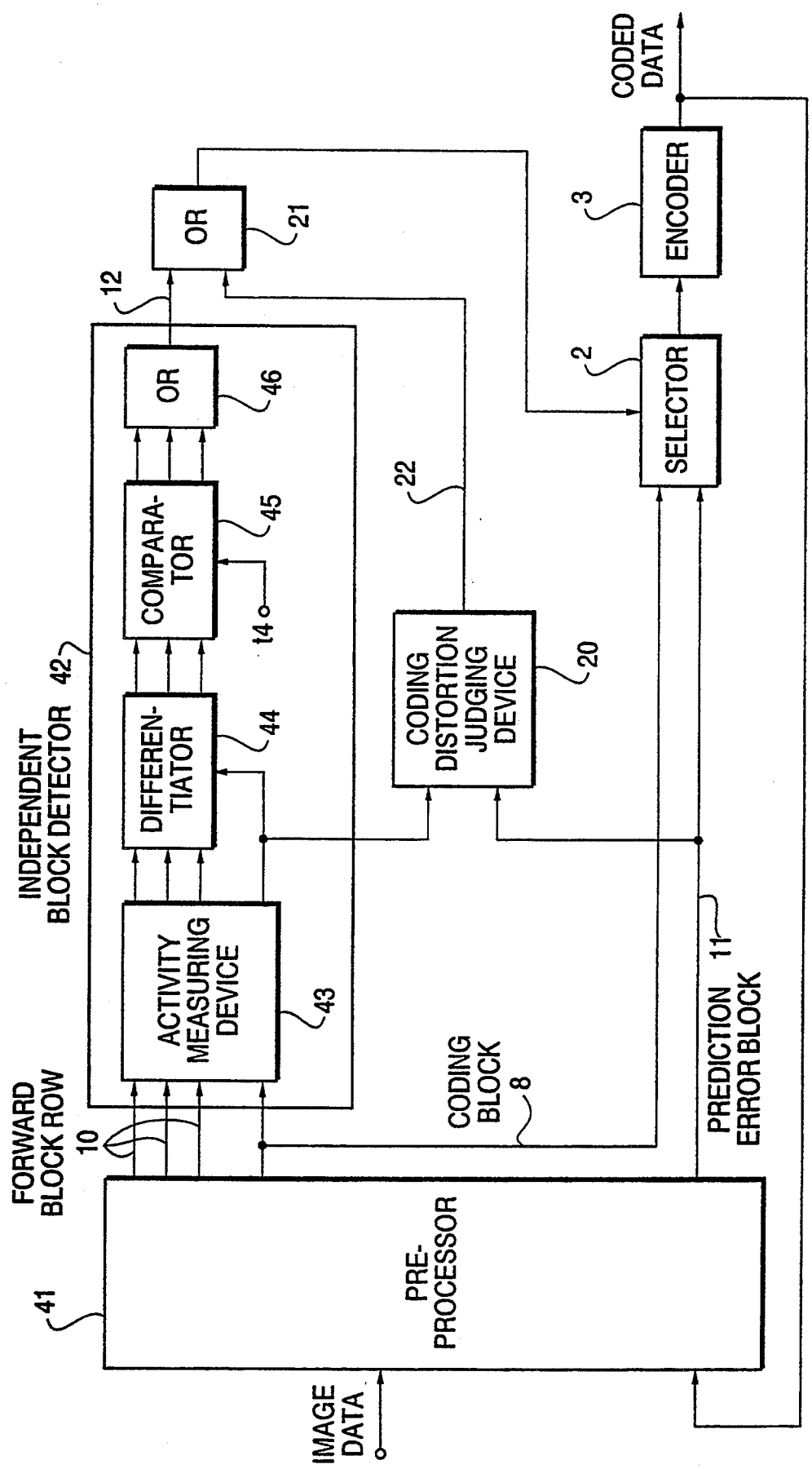
FIG. 9 is a block diagram of an independent block detector in a fifth embodiment of an image coding apparatus of the invention.

FIG. 9 shows a block diagram of a fifth embodiment of a coding apparatus of the invention. A preprocessor 41 in FIG. 9 determines the forward block row 10 and coding block 8 from the image data, and also determines and delivers a prediction error block 11 when the coding block 8 is predicted from the prediction signal obtained by decoding the coded data. An independent block detector 42 measures the activities of the coding block 8 and forward block 10 in an activity measuring device 43, and calculates the difference of the activity of each forward block 10 and the activity of coding block 8 in a differentiator 44, and the obtained difference and the required quantity t4 are compared in a comparator 45. Each output signal of the comparator 45 is 1 when the difference of the activities obtained in the differentiator 44 is larger than the required quantity t4, and is 0 when smaller than the required quantity t4. An OR circuit 46 calculates and produces an OR of the output signals of the comparator 45. Therefore, the output signal of the OR circuit 46 is 1 when the difference of the activity of at least one block out of the forward block row 10 and the activity of the coding block 7 is greater than the required quantity t4, and is 0 when the difference of the activity of the block out of the forward block row 10 and the activity of the coding block 8 is always smaller than the required quantity t4. The output signal of the OR circuit 56 is an independent block detection signal 12, and When it is 1, it is recognized as an independent block, and the coding block 8 is subjected to intra-frame coding independently of the reference frame 6.

A coding distortion judging device 20 is same as explained in the coding apparatus in FIG. 4, and a distortion judgement detection signal 22 which is an output signal of the coding distortion judging device 20 is 1 when it is recognized that the coding distortion is smaller by coding the coding block 8 than by coding the prediction error block 11, and is 0 when it is recognized that the coding distortion is smaller by coding the prediction error block 11. An OR circuit 21 is also the same as explained in the coding apparatus in FIG. 4, and is to calculate and produce an OR of the independent block detection signal 12 and distortion judgement detection signal 22. Therefore, either when the coding block 8 is detected as an independent block, or when it is detected that the coding distortion may be smaller by coding the coding block 8, the output signal of the OR circuit 21 is 1. When the output signal of the OR circuit 21 is 1, the selector 2 selects and produces the coding block 8 out of the coding block 8 and prediction error block 11, and the coding block 8 is coded in the encoder 3, and is subjected to intra-frame coding.

Figure 10:
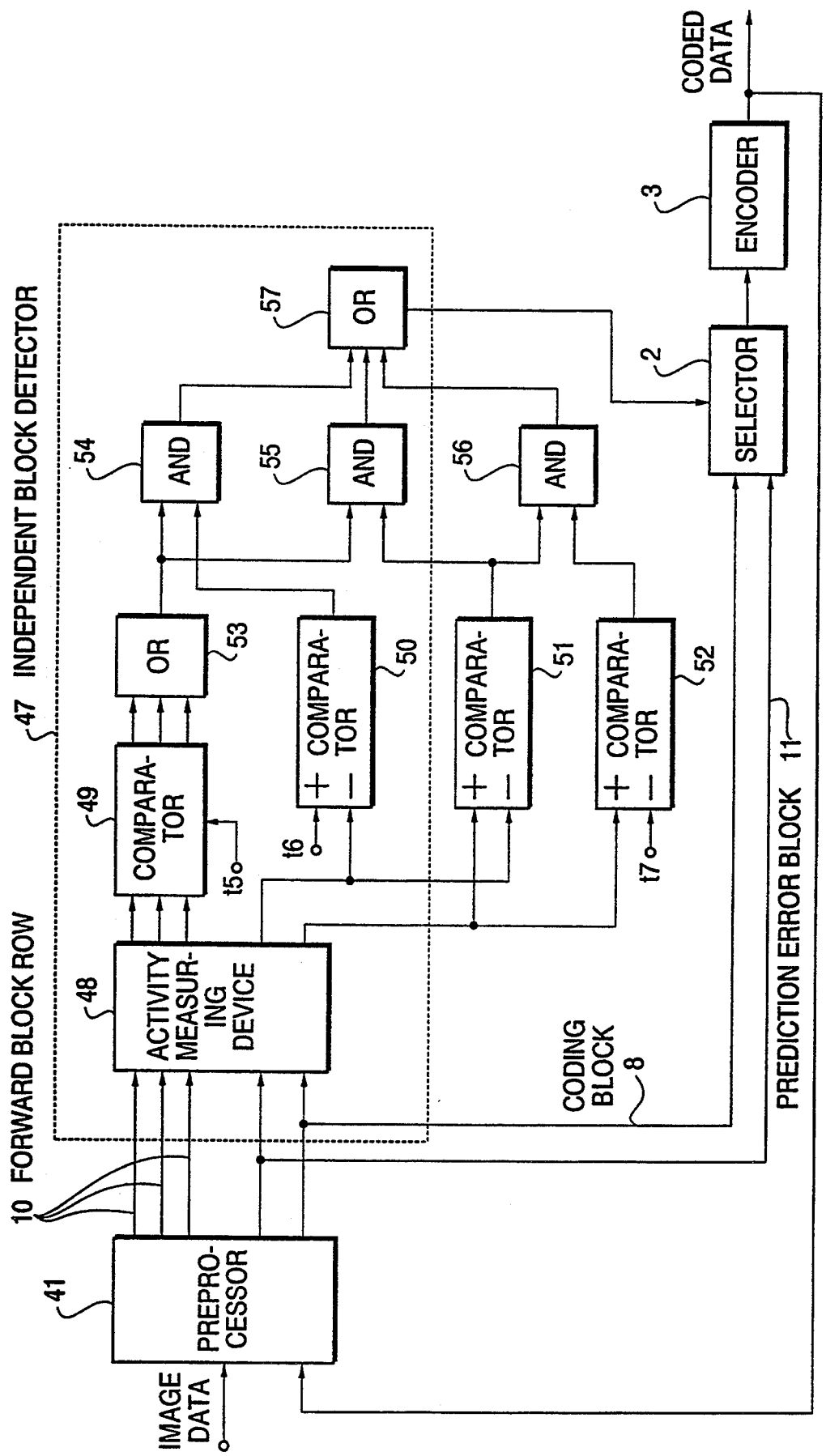
FIG. 10 is a block diagram of a sixth embodiment of an image coding apparatus of the invention.

FIG. 10 is a block diagram of a sixth embodiment of a coding apparatus of the invention. In FIG. 10, the preprocessor 41 determines the forward block row 10 and coding block 8 out of the image data, and determines and produces the prediction error block 11 by predicting the coding block 8 from the prediction signal determined by decoding the coded data. An activity measuring device 48 measures and produces the activities of the coding block 8 and forward block 10. A comparator 49 compares the activity of each forward block 10 and the required quantity t5. When the activity of each forward block 10 is greater than the required quantity t5, the output signal of the comparator 49 for that block is 1, and it is 0 when smaller than the required quantity t5. The output signal of the comparator 49 is fed into an OR circuit 53. The OR circuit 53 calculates and produces the OR of the output signals of the comparator 49 fed therein. That is, the output signal of the OR circuit 53 is 1 when the activity of at least one block out of the forward block row 10 is greater than the required quantity t5, and is 0 when the activities of all blocks of the forward block row 10 are less than the required quantity t5. A comparator 50 compares the activity of the coding block 8 and the required quantity t6. The output signal of the comparator 50 is 1 when the activity of the coding block 8 is smaller than the required quantity t6, and is 0 when greater than the required quantity t6. An AND circuit 54 calculates and produces an AND of the output signal of the OR circuit 53 and the output signal of the comparator 50. Therefore, the output signal of the AND circuit 54 is 1 when the activity of at least one block of the forward block row 10 is greater than the required quantity t5 and the activity of the coding block 8 is smaller than the required quantity t6, and is 0 otherwise. When the output signal of the AND circuit 54 is 1, the coding block 8 is recognized as an independent block.

A comparator 51 compares the activity of the coding block 8 and the activity of the prediction error block 11. The output signal of the comparator 51 is 1 when the activity of the coding block 8 is smaller than the activity of the prediction error block 11, and is 0 when greater than the activity of the prediction error block 11. A comparator 52 compares the activity of the prediction error block 11 with the required quantity t7, and the output signal of the comparator 52 is 1 when the activity of the prediction error block 11 is greater than the required quantity t7, and 0 when smaller than the required quantity t7. An AND circuit 56 calculates and produces an AND of the output signal of the comparator 51 and the output signal of the comparator 52. Therefore, the output signal of the AND circuit 56 is 1 when the activity of the prediction error block 11 is greater than the activity of the coding block 8 and the activity of the prediction error block 11 is greater than the required quantity t7, and is 0 otherwise. That the output signal of the AND circuit 56 is 1 is the result of recognizing that the coding distortion is smaller when coding the coding block 8 than when coding the prediction error block 11. This judgement of coding distortion is the same as in FIG. 7.

The AND circuit 55 calculates and produces the AND of the output signal of the OR circuit 53 and the output signal of the comparator 51. An OR circuit 57 calculates and produces an OR of the output signals of the AND circuits 54, 55, 56. When the output signal of the OR circuit 57 is 1, the selector 2 selects and produces the coding block 8 out of the coding block 8 and prediction error block 11, and the coding block 8 is coded by the encoder 2, and intra-frame coding is effected. On the other hand, when the output signal of the OR circuit 57 is 0, the prediction error block 11 is coded, and inter-frame predictive coding is effected.

In FIG. 10, when the region complicated in the change of pixel level in any one frame of forward frame row 7 is a flag region of a small change of pixel level in the coding frame 5, the pattern in the region of the coding frame 5 is a pattern newly appearing by the movement of the object in the image, and it is highly possible that the pattern does not exist in the reference frame 6. When the block containing such pattern is predicted from the reference frame 6 and coded, residue noise of the moving object occurs and the picture quality deteriorates, but by performing intra-frame coding independently of the reference frame 6, the residue noise can be removed.

Next, in the case wherein at least one forward block 10 is a block having complicated changes in the pixel level, the activity of the coding block 8 is greater than t6 and it is not recognized as a flat part having small change of pixel level, the activity of the coding block 8 and the activity of the prediction error block 11 are compared in the comparator 51, and the intra-frame coding or inter-frame predictive coding is effected depending on the result of comparison. That is, when the activity of the prediction error block 11 is greater than the activity of the coding block 8, intra-frame coding is effected. It does not, however, depend on the output of the comparator 52. Meanwhile, the pixel level does not change complicatedly in any one of all blocks in the forward block row 10, either one smaller in the coding distortion is selected depending on the activities of the coding block 8 and the prediction error block 11, and either intra-frame coding or inter-frame predictive coding is effected.

The number of frames between the reference frame 6 and coding frame 5 is two in FIG. 2, but it is not limitative.

Alternately, instead of detecting the independent block by inspecting the activities of all forward block rows 10, the activity may be investigated only in a desired plurality of blocks out of the forward block row 10. Examples of investigating the activity of only one block out of the forward block row 10, that is, only the reference block 9 are as represented by the independent block detector 1 in FIGS. 1, 4, 6, and 7.

In the foregoing embodiments, only one reference frame is indicated, but the following explanation relates to a case of predicting and coding the coding frame by using plural reference frames which are forward reference frame positioned in the past from the coding frame and backward reference frame positioned in the future.

Figure 11:
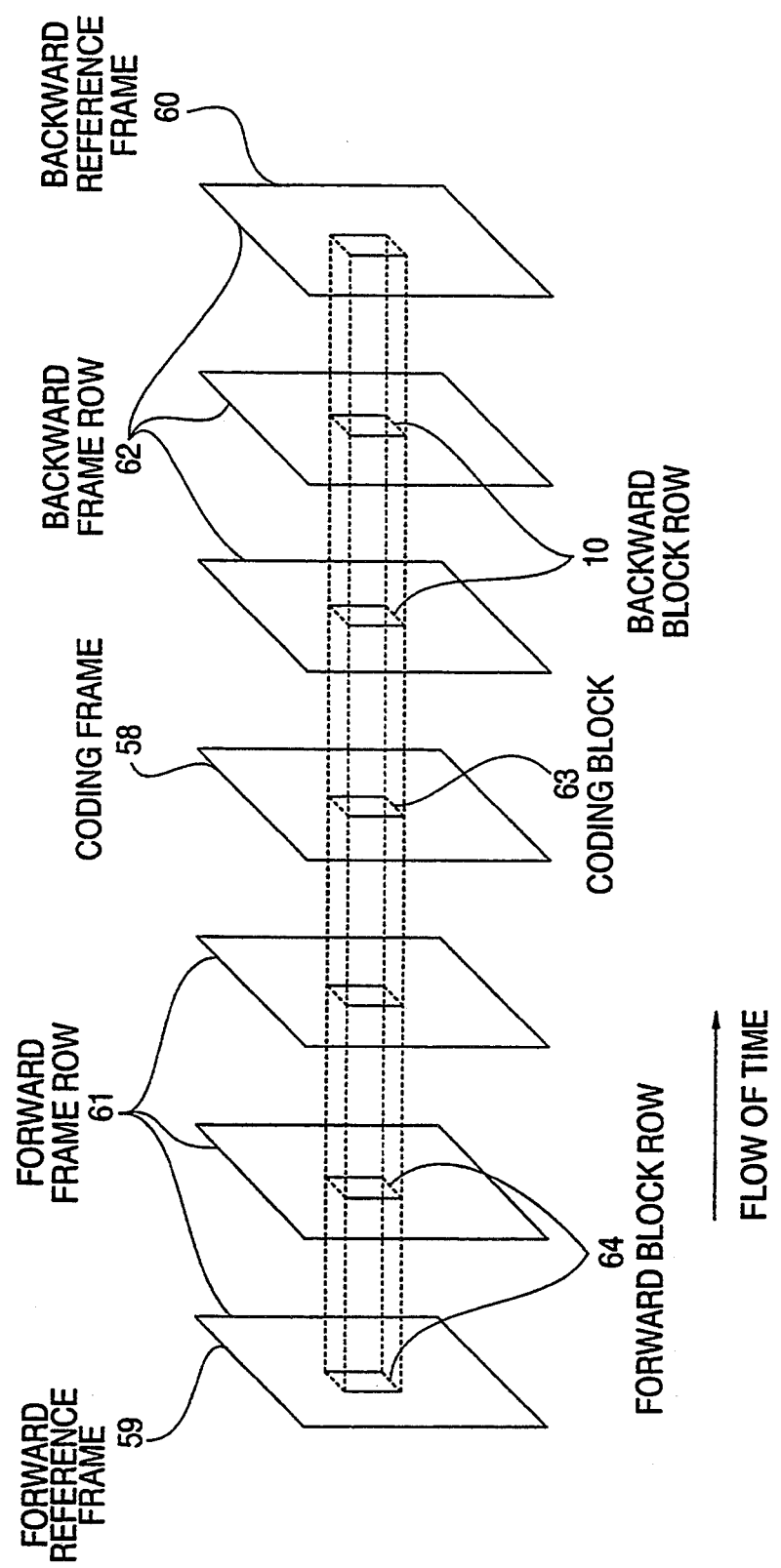
FIG. 11 is an explanatory diagram of a time configuration of a coding frame, forward reference frame, and backward reference frame.

FIG. 11 is an example of the time configuration of frames. In FIG. 11, the frame positioned ahead in time as seen from the coding frame and positioned up to the forward reference frame 59 is designated a forward frame row 61. The frame row positioned behind in time from the coding frame 58 and positioned up to the backward reference frame 60 is the backward frame row 62. Furthermore, the block positioned at the coding block 63 within the coding frame 58 in each frame of the forward frame row 61 is a forward block row 62, and the block positioned at the coding block 63 within the coding frame 58 in each frame of the backward frame row 62 is a backward block row 65. The case in FIG. 11 is described below.

Figure 12:
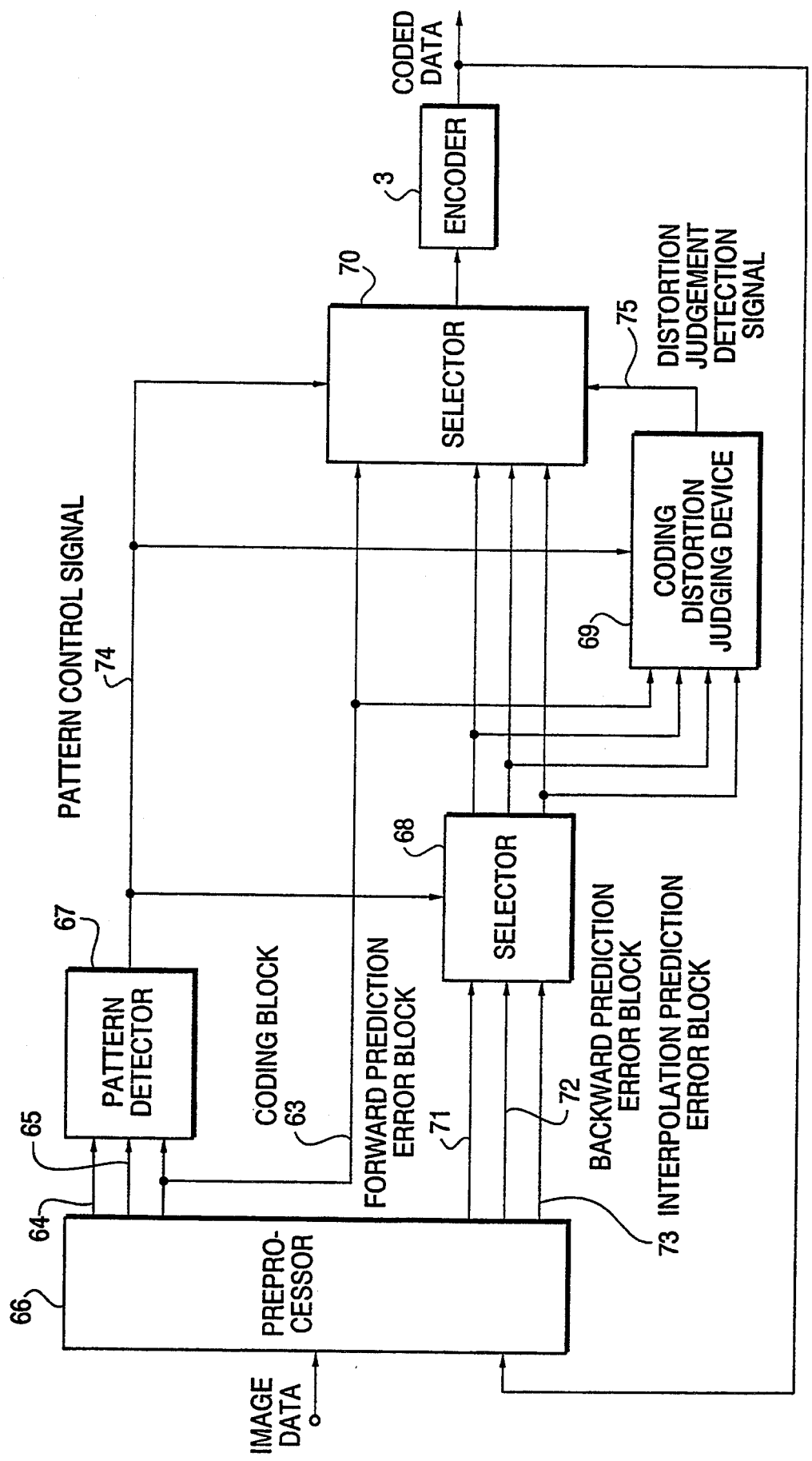
FIG. 12 is a block diagram of a seventh embodiment of an image coding apparatus of the invention.

FIG. 12 is a block diagram of a seventh embodiment of a coding apparatus of the invention. The embodiment in FIG. 12 is composed of a preprocessor 66, a pattern detector 67, a first selector 68, a coding distortion judging device 69, a second selector 70, and an encoder 3.

The preprocessor 66, receiving image data, produces a forward block row 64, a backward block row 65, and a coding block 63. Further decoding the coded data, a reproduction frame of a forward reference frame 59, and a reproduction frame of a backward reference frame 60 are determined. In addition, an interpolation frame is determined from the reproduction frame of forward reference frame 59 and reproduction frame of backward reference frame 60. It further determines and produces a forward prediction error block 71 which is a prediction error signal by predicting the coding block 63 from the reproduction frame of the obtained forward reference frame 59, a backward prediction error block 72 which is a prediction error signal by predicting the coding block 63 from the reproduction frame of the backward reference frame 60, and an interpolation prediction error block 73 which is a prediction error signal by predicting from the interpolation frame.

The pattern detector 67 detects that the pattern of the coding block 63 is present in the forward reference frame 59 or backward reference frame 60 by receiving the forward block row 64, backward block row 65 and coding block 63, and produces the result of detection as a pattern control signal 74. The pattern control signal 74 is expressed in a two-digit binary figure, which is 11 when the pattern of the coding block 63 is present in both forward reference frame 59 and backward reference frame 60, 10 when present only in the forward reference frame 59, 01 when present only in the backward reference frame 59, and 00 when present in either reference frame.

The coding block 63 is a bidirectionally-prediction-coded block when the pattern control signal 74 is 11, a forward-prediction-coded block when 10, a backward-prediction-coded block when 01, and an independent block when 00. When the coding block 63 is a bidirectionally-prediction-coded block, any one of the forward prediction error block 71, backward prediction error block 72, and interpolation prediction error block 73 is an optimum prediction error signal block. When the coding block 63 is a forward-prediction-coded block, the forward prediction error block 72 is the optimum prediction error block, and when it is the backward-prediction-coded block, the backward prediction error block 72 is selected as the optimum prediction error block. These selections are effected by the first selector 68 according to the pattern control signal 74. When the pattern control signal 74 is 11 and the coding block 63 is recognized as a bidirectionally-prediction-coded block, the first selector 68 produces the forward prediction error block 71, backward prediction error block 72, and interpolation prediction error block 73. When the pattern control signal 74 is 10, and the coding block 63 is recognized as a forward-prediction-coded block, the first selector 68 produces only the forward prediction error block 71. When the pattern control signal 74 is 01, and the coding block 63 is recognized as a backward-prediction-coded block, the first selector 68 produces only the backward prediction error block 72. When the pattern control signal 70 is 00 and the coding block 63 is recognized as an independent block, the first selector 68 produces no block at all.

A coding distortion judging device 69 detects the block for obtaining the minimum coding distortion in a specified code quantity out of the input blocks, and produces a distortion judgment detection signal 75. The coding distortion judging device 69 receives the block selected by the first selector 68 and the coding block 63. Therefore, when the coding block 68 is a bidirectionally-prediction-coded block, it receives the coding block 63, forward prediction error block 71, backward prediction error block 72, and interpolation prediction error block 73, and the block of the minimum coding distortion among them is detected. When the coding block 63 is a forward-prediction-coded block, the forward prediction error block 71 and coding block 63 are entered, and when it is a backward-prediction-coded block, the backward prediction error block 72 and coding block 68 are entered, and the one having the smaller coding distortion out of the inputs is detected. When the coding block 63 is an independent block, only the coding block 63 is entered. The distortion judgement detection signal 75 which is the output of the coding distortion judging device 69 is expressed in a two-digit binary figure, and it is 11 when the smallest coding distortion block is recognized to be the interpolation prediction error block 73, 10 when recognized to be the forward prediction error block 71, 01 when recognized to be the backward prediction error block 72, and 00 when recognized to be the coding block 63. Further, when the pattern control signal 74 is 00 and the coding block 63 is recognized to be an independent block, the distortion judgement detection signal 75 should be 00.

The second selector 70 selects, depending on the distortion judgement detection signal 75, any one of the coding block 63, forward prediction error block 71, backward prediction error block 72 and interpolation prediction error block 73. It selects and produces the interpolation prediction error block 73 when the distortion judgement detection signal is 11, the forward prediction error block 71 when 10, the backward prediction error block 72 when 01, and the coding block 63 when 00. The block selected by the second selector 70 is encoded by the encoder 3.

Herein, when the coding block 63 is an independent block, the distortion judgement detection signal 75 is 00, but it is not limitative, and it may be undetermined, and when the pattern control signal 74 is 00, the coding block 63 may be selected and produced by the second selector 70 regardless of the distortion judgement detection signal 75. Incidentally, the input signal of the second selector 70 may be the output signal of the first selector 68 and the coding block 63 as shown in FIG. 2, or may be also forward prediction error block 71, backward prediction error block 72, interpolation error block 73, and coding block 63. This is because the result is always the same when the output signal is selected depending on the pattern control signal 74 and distortion judgement detection signal 75.

Thus, by predicting only from the prediction reference frame in which the pattern of the coding block 63 is present, the residue noise of the moving object is removed, and the image quality is improved. The coding distortion judging device 69 may recognized that the one of the smallest variance of the input signal row is smallest in the coding distortion at the specified code quantity the same as the coding distortion judging device 20 as shown in FIG. 4, or may recognize the one smallest in the entropy to have the minimum coding distortion by measuring the entropy of the input signal row, or any other technique may be used that detects the minimum coding distortion at the specified code quantity.

Figure 13:
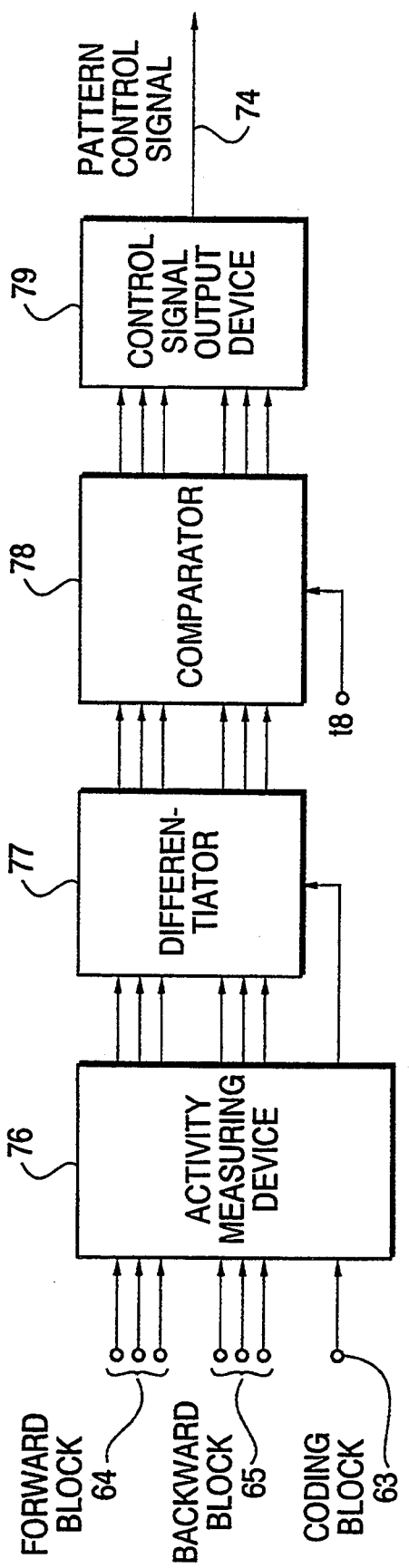
FIG. 13 is a block diagram of a pattern detector in an eighth embodiment of an image coding apparatus of the invention.

FIG. 13 is a block diagram of an example of a pattern detector 67 in FIG. 12 as an eighth embodiment of an image coding apparatus of the invention. The coding frame is supposed herein to be positioned as shown in FIG. 11. The pattern detector 67 in FIG. 13 is composed of an activity measuring device 76, a differentiator 77, a comparator 78 and a control signal output device 79. In FIG. 13, the activity measuring device 76 is to measure and produce the activities of the forward block row 64, coding block 63, and backward block row 65 to the individual blocks. As the activities of the blocks, as in the foregoing embodiments, the variance of the pixel level in the block is calculated.

The differentiator 77 measures and produces the difference between the activities of the blocks in the forward block row 64 and backward block row 65 obtained by the activity measuring instrument 76, and the activity of the coding block 63. The comparator 78 compares the output signal of the differentiator 77 with the required quantity t8 individually. The output signal of the comparator 78 is 1 when the output signal of the differentiator 77 is greater than the required quantity t8, and 0 when smaller than the required quantity t8. The output signal at the comparator 78 is fed into the control signal output device 79, and the control signal output device 79 produces the pattern control signal 74. The pattern control signal 74 is expressed in a two-digit binary figure, and the pattern control signal 74 is 00 when the output signal of the comparator 78 corresponding to at least one block of the forward block row 64 is 1 and the output signal of the comparator 78 to at least one block of the backward block row 65 is 1. Further, the pattern control signal 74 is 01 when the output signal of the comparator 78 corresponding to at least one block of the forward block row 64 is 1 and the output signal of the comparator 78 corresponding to all blocks of the backward block row 65 is 0. The pattern control signal 74 is 01 when the output signal of the comparator 78 corresponding to all blocks of the forward block row 64 is 0 and the output signal of the comparator 78 to at least one block out of the backward block row 65 is 1. The pattern control signal 74 is 11 when the output signal of the comparator 78 corresponding to all blocks of the forward block row 64 is 0 and the output signal of the comparator 78 corresponding to all blocks of the backward block row 65 is 0.

Therefore, when the difference between the activity of at least one block out of the forward block row 64 and the activity of the coding block 63 is greater than the required quantity t8, the pattern of the coding block 63 is detected as being not present in the forward reference frame 59. On the other hand, when the difference between the activity of at least one block in the backward row 65 and the activity of the coding block 63 is greater than the required quantity t8, the pattern of the coding block 63 is detected as being not present in the backward reference frame 60.

When the difference between the activity of at least one block out of the forward block row 64 and the activity of the coding block 63 is greater than the required quantity t8, it means the activity is changed largely, and hence it is known that the object is moved from the forward reference frame 59 to the coding frame 58. In this case, the pattern of the coding block 63 does not exist in the forward reference frame 59, and is recognized to be a newly appearing pattern as seen from the forward reference frame 59. Similarly, the pattern disappearing in the backward reference frame 60 by the movement of the object may be also recognized by investigating the difference between the activity of the backward block row 65 and the activity of the coding block 63.

In this way, by adaptively selecting the prediction reference frame by the pattern control signal 74 which is the output of the control signal output device 79, the residue noise due to movement of the object is eliminated, and the picture quality is improved, and a highly efficient coding is realized.

The required quantity t8 is properly about 500, supposing the pixel level to be 256 gradations and using the variance of the pixel level of a block as the activity of the block. This is because the variance of the block with a small change of pixel level is 30 or less, and the variance of the block with a large change of pixel level is over 500. Not limited to this, however, efficient coding is effected by Properly varying depending on the image.

Figure 14:
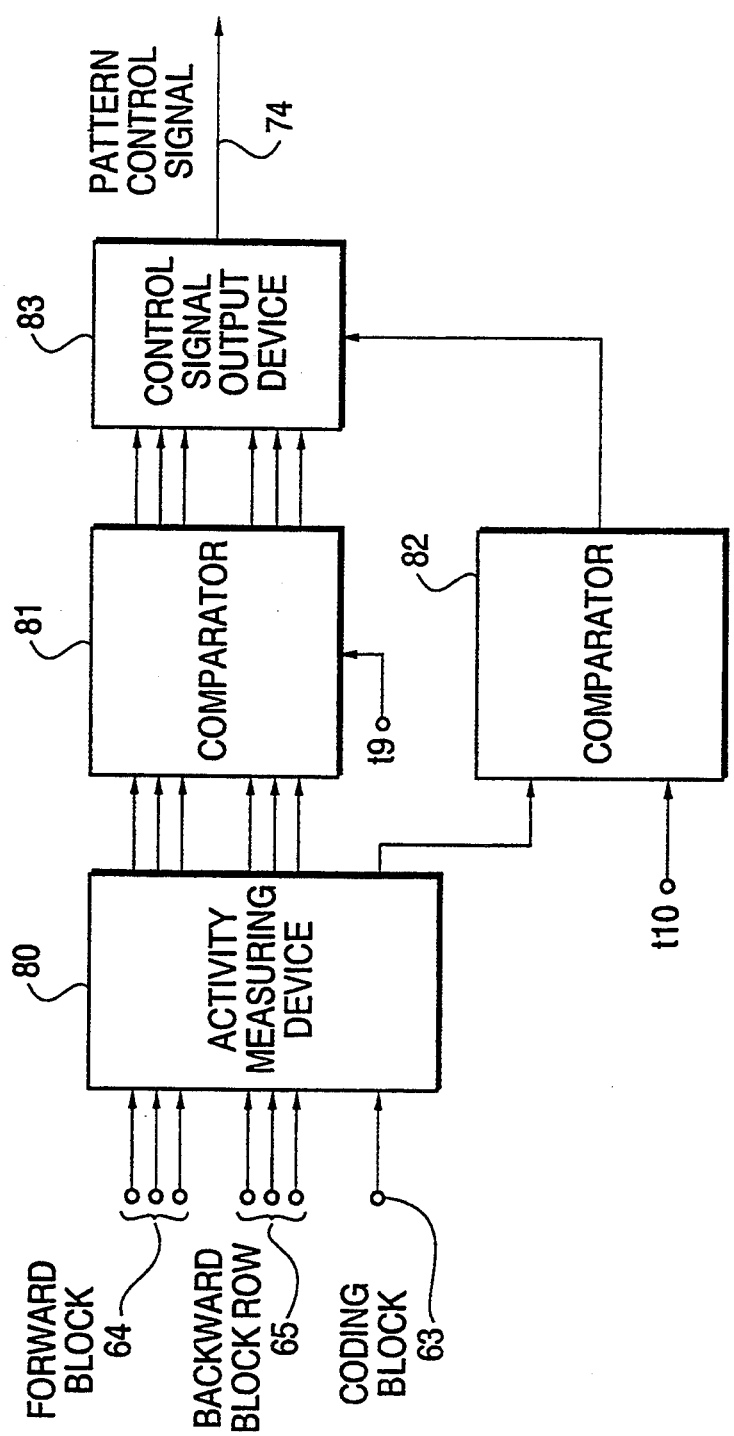
FIG. 14 is a block diagram of a pattern detector in a ninth embodiment of an image coding apparatus of the invention.

FIG. 14 is a block diagram of another example of the pattern detector 67 in FIG. 12 as a ninth embodiment of the coding apparatus of the invention. The coding frame 58 is assumed to be positioned as shown in FIG. 11. The pattern detector 67 in FIG. 14 is composed of an activity measuring device 80, a first comparator 81, a second comparator 82, and a control signal output device 83. The activity measuring device 80 in FIG. 14 is to measure and produce the activities of the input signal rows, that is, the forward block row 64, coding block row 63, and backward block row 65, and the variance of the pixel level is measured. The first comparator 81 compares the activities of the forward block row 64 and backward block row 64 obtained by the activity measuring device 80 with the required quantity t9. When the activity of each block is greater than the required quantity t9, the output signal of the comparator 81 to that block is 1, and when smaller than the required quantity t9, it is 0. The second comparator 82 compares the activity of the coding block 63 with the required quantity t10. The output signal of the second comparator 82 is 1 when the activity of the coding block 63 is smaller than the required quantity t10, and is 0 when greater than the required quantity t10. The output signals of the first comparator 81 and the second comparator 82 are fed into the control signal output device 83. The control signal output device 83 produces a pattern control signal 74 which is expressed in a two-digit binary code. The pattern control signal 74 is 00 when the output signal of the first comparator 81 corresponding to at least one block of the forward block row 64 is 1, the output signal of the first comparator corresponding to at least one block of the backward block row 65 is 1, and the output of the second comparator 82 is 1. The pattern control signal 74 is 01 when the output signal of the first comparator 81 corresponding to at least one block of the forward block row 64 is 1, the output signal of the first comparator corresponding to all blocks of the backward block row 65 is 0, and the output of the second comparator 82 is 1. The pattern control signal 74 is 10 when the output signal of the first comparator 81 to all blocks of the forward block row 64 is 0, the output signal of the first comparator 81 to at least one block of the backward block row 64 is 1, and the output of the second comparator 82 is 1. Otherwise, the pattern control signal 74 is always 11.

Therefore, the pattern detector 67 in FIG. 14 detects that the pattern of the coding block 63 is independent, not present in the forward reference frame 59, when the activity of at least one block in the forward block row 64 is greater than the required quantity t9 and the activity of the coding block 63 is smaller than the required quantity t10. Likewise, when the activity of at least one block in the backward block row 65 is greater than the required quantity t9 and the activity of the coding block 63 is smaller than the required quantity t10, the pattern of the coding block 63 is detected as being not present in the backward reference frame 60.

When the activity of at least one block out of the forward block row 64 or backward block row 65 is greater than the required quantity t9, and the activity of the coding block 63 is smaller than the required quantity t10, it is estimated that the movement of the object large in the change of pixel level has been present in the forward frame row 61 or backward frame row 62. That is, the pattern in the coding block 63 is recognized to be a pattern small in activity, and to be a pattern in the shade of the moving object in the forward reference frame 59 or backward reference frame 60. Since the residue noise due to the moving object generated in the pattern small in the change of pixel level is particularly obvious to the human eye, the prediction reference frame is adaptively selected only when the activity of the coding block 63 is smaller by the second comparator 82. When the activity of the coding block 63 is greater than the required quantity t10, it is assumed to be present in both forward reference frame 59 and backward reference frame 60, and the pattern control signal 74 is produced, and the signal row to be entered in the encoder 3 is selected by the selector 70 depending on the distortion judgement detection signal 75 which is the output of the coding distortion judging device 69 in FIG. 12.

Meanwhile, the required quantities t9, t10 in the pattern detector 67 in FIG. 14 should be properly about 500 and 30, respectively, assuming the pixel level to be 256 gradations, and using the variance of pixel level as the activity of the block. This is because the variance of a flat block with a small activity is 30 or less, and the variance of a complicated block with a large activity is over 500. These are not, however, limitative, and an efficient coding is possible by adaptively changing depending on the image.

Figure 15:
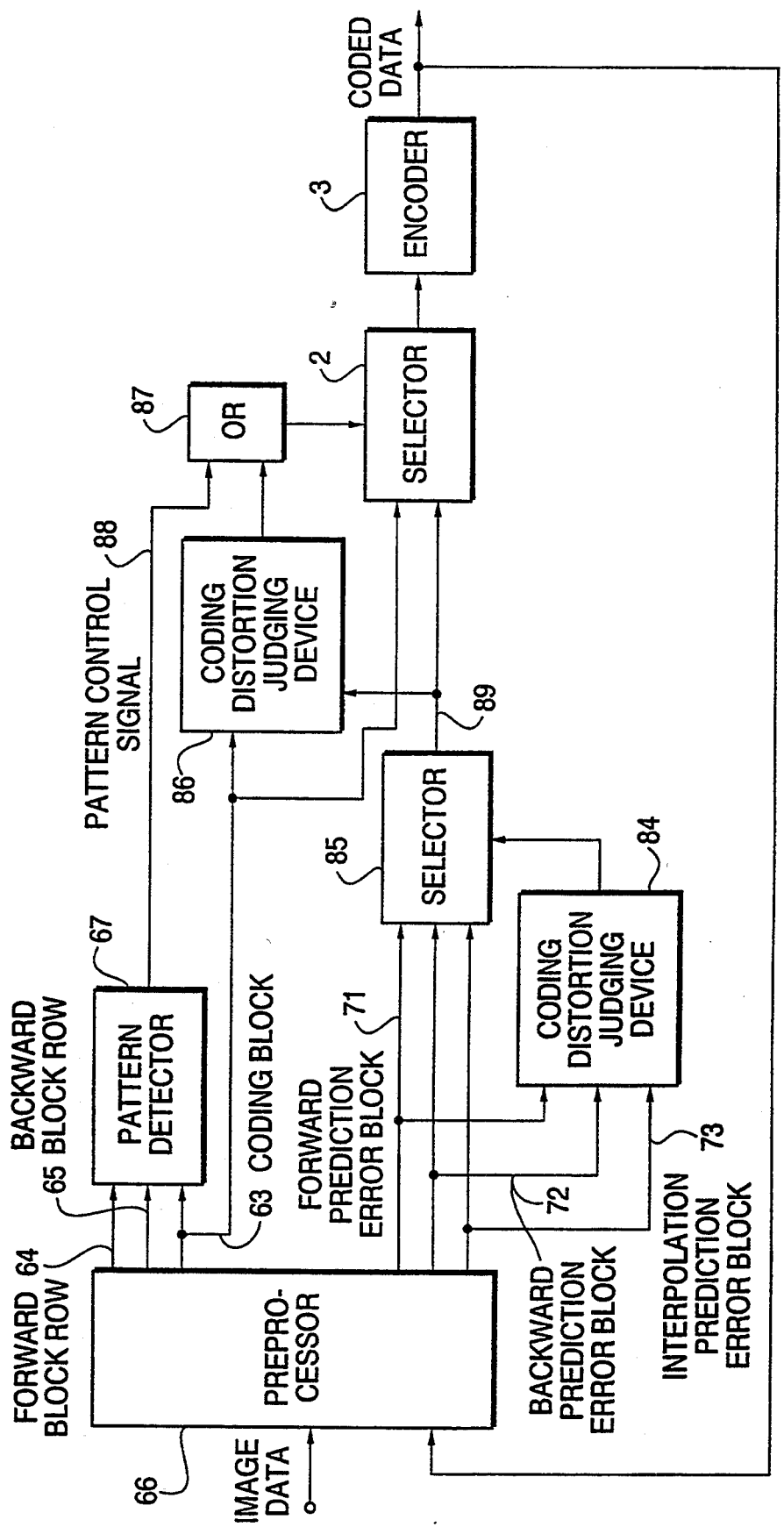
FIG. 15 is a block diagram of a tenth embodiment of an image coding apparatus of the invention.

FIG. 15 is a block diagram of other embodiment of a coding apparatus of the invention. In FIG. 15, a preprocessor 66 is the same as the preprocessor 65 in FIG. 12, in which forward block row 64, backward block row 65, and coding block 63 are determined from the image data and produced, and the coded data is decoded, and the prediction signal of the coding block 63 is determined, and the prediction error signals at the time of prediction, that is the forward prediction error block 71, backward prediction error block 72, and interpolation prediction error block 73 are delivered. The pattern detector 67 is as explained in FIG. 13 or FIG. 14. The pattern control signal 88 which is the output signal of the pattern detector 67 and expressed in a one-digit binary figure is 1 when the pattern of the coding block 63 is detected to be present in neither forward reference frame 59 nor backward reference frame 60. That is, the pattern control signal 88 is 1 when the coding block 63 is an independent block, and is 0 otherwise. The first coding distortion judging device 84 is to detect the optimum prediction error block 89 capable of obtaining the smallest coding distortion at the specified code quantity, out of the forward prediction error block 71, backward prediction error block 72, and interpolation prediction error block 73. The first selector 85 selects and produces the optimum prediction error block 89 for obtaining the smallest coding distortion detected by the first coding distortion judging device 84. Furthermore, the second coding distortion judging device 86 detects the block capable of obtaining the smaller coding distortion at the specified code quantity, out of the optimum prediction error block 89 and the coding block 63 selected by the first selector 85. The output of the second coding distortion judging device 89 is 1 when the coding distortion is smaller by coding the coding block 63 than by coding the optimum prediction error block 89, and is 0 when the coding distortion is smaller by coding the optimum prediction error block 89. An OR circuit 87 is to calculate and produce an OR of the output signal of the coding distortion judging device 86 and the pattern control signal 88. Therefore, when the coding block 63 is an independent block, or when the coding distortion is smaller when coding the coding block 63 than when coding the optimum prediction error block 89, the output of the OR circuit 87 is 1. The second selector 2 selects and produces the coding block 63 out of the coding block 63 and optimum prediction error group 89 when the output signal of the OR circuit 87 is 1. in this case, the coding block 63 is fed into the encoder 3, and the intra-frame coding is effected. On the other hand, when the output signal of the OR circuit 87 is 0, the optimum prediction error block 89 is selected by the second selector 2, and Is fed into the encoder 3, thereby effecting the inter-frame predictive coding.

When the Image signal is composed of a luminance signal and a color signal, either intra-frame coding or inter-frame predictive coding may be selected for individual signals, or either the intra-frame coding or inter-frame predictive coding may be selected in the luminance signal only, and when the intra-frame coding is effected in the luminance signal, the color signal may be also processed by the intra-frame coding.

In FIG. 11, meanwhile, the number of frames positioned between the forward reference frame and backward reference frame is five in consideration of time, but it is not limitative.

Meanwhile, in FIGS. 12, 13, 14, and 15, it is detected that the pattern of the coding block 63 is present in the reference frame by detecting the activities of all blocks of the forward block row 64 and backward block row 65, but not limited to this, the presence of the pattern of the coding block 63 in the reference frame may be detected also by detecting the activities of a specific number of blocks out of the forward block row 64.and a specific number of blocks out of the backward block row 65.

Moreover, only when the plural pixel levels of the pixels in the coding block are in a specified range, it may be detected whether the pattern of the coding block is present in the reference frame or not. This Is because the residue image of the moving object involves a range of pixel levels obvious to the human eye, and it is intended to process only within this range. As an embodiment thereof, the mean of the pixels in the coding block is measured, and only when the mean is within a specified range, it is detected whether the pattern of the coding block is present in the reference frame or not. Not limited to the mean, it may be also possible to detect if the pixel level of plural representative pixels is present in the specified range. Such specified range should be properly 120 to 180 when the pixel level is of 256 gradations, but this is not limitative.

The size of the block is generally 8 pixels × 8 pixels in the case of quantizing and coding the conversion coefficient by two-dimensional discrete cosine transform in coding, but it is not limitative, and any size may be applicable. Alternately, by detecting if the pattern of the coding block is present in the reference frame or not in a small block unit, the result may be applied to a large block composed of plural small blocks. In the method of applying to the large block, when it is detected that the pattern of at least one small block in the large block is not Present in the reference frame, it may be judged that the large block is not present in the reference frame, or the most frequent detection result of the small blocks composing the large block may be used as the detection results of the large block.

The image data is processed in a frame unit herein, but it may be processed in field units in an interlaced image.

What is claimed is:

1. An image coding method for dividing a picture to be coded into blocks each composed of adjacent plural pixels, predicting a block to be coded by using a reference picture, and coding each block, comprising the steps of:

detecting a block included in an image region not existing in the reference picture and newly appearing in the picture to be coded as an independent block from an activity of a block in the picture to be coded and an activity of a corresponding reference block at the same position as said block in the picture to be coded in the reference picture;

detecting, among blocks other than the independent block in the picture to be coded, a block which is smaller in coding distortion at a specified code quantity than a corresponding prediction error block predicted from a prediction signal obtained by using the reference picture; and coding each of the independent block and the block which is smaller in the coding distortion than the corresponding prediction error block independently without depending on the reference picture.

2. An image coding method of claim 1, wherein the step of detecting the block to be coded as an independent block comprises the steps of:

detecting an activity of pixel level in the block to be coded in the picture to be coded;

detecting an activity of pixel level in a reference block at the same position as the block to be coded in the reference picture;

determining a difference between the activity of the block to be coded and the activity of the reference block;

comparing said difference with a specific value; and detecting the block to be coded as an independent block when said difference is greater than the specific value.

3. An image coding method for dividing a picture to be coded into blocks each composed of adjacent plural pixels, predicting a block to be coded by using a reference picture, and coding each block, comprising the steps of:

detecting a block containing an image pattern not existing in the reference picture and newly appearing in the picture to be coded as an independent block; and coding the independent block independently without depending on the reference picture, wherein the step of detecting an independent block comprises the steps of:

detecting an activity of pixel level in a block in the picture to be coded;

detecting an activity of pixel level in a corresponding reference block at the same position as said block in the picture to be coded in the reference picture;

comparing the activity of said block in the picture to be coded with a first specific value;

comparing the activity of the corresponding reference block with a second specific value; and detecting said block in the picture to be coded as an independent block when the activity of said block in the picture to be coded is smaller than the first specific value and the activity of the corresponding reference block is larger than the second specific value.

4. An image coding method of claim 1, wherein an arbitrary sequence of pictures located in time between the picture to be coded and the reference picture is a forward picture sequence, and a sequence of blocks of the forward picture sequence in a same position as the block to be coded in the picture to be coded in the forward picture is a forward block sequence, the step of detecting the block to be coded as an independent block comprises the steps of:

detecting an activity of pixel level of the block to be coded;

detecting an activity of pixel level in each block of the forward block sequence;

determining a difference between the activity of each block of the forward block sequence and the activity of the block to be coded;

comparing the difference between the activity of each block of the forward block sequence and the activity of the block to be coded with a specific value; and detecting the block to be coded as an independent block when the difference between the activity of at least one block in the forward block sequence and the activity of the block in the picture to be coded is greater than the specific value.

5. An image coding method of claim 1, wherein an arbitrary sequence of pictures located in time between the picture to be coded and the reference picture is a forward picture sequence, and a sequence of blocks of the forward picture sequence in a same position as the block to be coded in the picture to be coded and a block in a picture in the forward picture and a block in a picture in the forward picture is a forward block sequence, the step of detecting the block to be coded as an independent block comprises the steps of:

detecting an activity of pixel level of the block to be coded;

detecting an activity of pixel level in each block of the forward block sequence;

comparing the activity of the block to be coded with a first specific value;

comparing the activity of each block of the forward block sequence with a second specific value; and detecting the block to be coded as an independent block when the activity of the block to be coded is smaller than the first specific value, and the activity of at least one block in the forward block sequence is larger than the second specific value.

6. An image coding apparatus for dividing a picture to be coded into blocks each composed of adjacent plural pixels, predicting a block to be coded by using a reference picture, and coding each block, comprising:

means for detecting a block included in an image region not existing in the reference picture and newly appearing in the picture to be coded as an independent block from an activity of a block in the picture to be coded and an activity of a corresponding reference block at the same position as said block in the picture to be coded in the reference picture;

means for detecting, among blocks other than the independent block in the picture to be coded, a block which is smaller in coding distortion in a specified code quantity than a corresponding prediction error block predicted from a prediction signal obtained by using the reference picture; and means for coding each of the independent block and the block which is smaller in coding distortion than the corresponding prediction error block independently without depending on the reference picture.

7. An image coding apparatus of claim 6, wherein supposing the block in the reference picture at the same position as the block to be coded in the picture to be coded to be a reference block, the means for detecting the block to be coded as an independent block comprises:
   activity measuring means for measuring an activity of pixel level in the block to be coded;
   differentiating means for producing a difference between the activity of the block to be coded obtained by the activity measuring means, and an activity of the reference block; and
   means of detecting the block to be coded as an independent block when an output of the differentiating means is greater than a specific value by comparing the output of the differentiating means with the specific value.

8. An image coding apparatus for dividing a picture to be coded into blocks each composed of adjacent plural pixels, predicting the image to be coded by using a reference picture, and coding each block, comprising:
   means for detecting a block included in an image region not existing in the reference picture and newly appearing in the picture to be coded as an independent block; and
   means for coding the independent block independently without depending on the reference picture,
   wherein the means for detecting an independent block comprises:
   activity measuring means for measuring an activity of pixel level in each of a block in the picture to be coded and a corresponding reference block at the same position as said block in the picture to be coded in the reference picture;
   first comparison means for comparing the activity of said block in the picture to be coded obtained by the activity measuring means with a first specific value;
   second comparison means for comparing the activity of the corresponding reference block obtained by the activity measuring means with a second specific value; and
   means for determining said block in the picture to be coded as an independent block when the activity of said block in the picture to be coded is detected to be smaller than the first specific value by the first comparison means and the activity of the corresponding reference block is detected to be greater than the second specific value by the second comparison means.

9. An image coding apparatus of claim 6, wherein an arbitrary sequence of pictures located in time between the picture to be coded and the reference picture is a forward picture sequence, and a sequence of blocks of the forward picture sequence in a same position as the block to be coded in the picture to be coded is a forward block sequence, the means for detecting the block to coded as an independent block comprises:
   activity measuring means for measuring an activity of pixel level in the block to be coded;
   differentiating means for producing a difference between an activity of each block in the forward block sequence obtained by the activity measuring means and an activity of the block to be coded; and
   means for detecting the block to be coded to be an independent block, when one of the differences between the activity of the block of the forward block sequence as the output of the differential means and the activity of the block to be coded is greater than a specific value.

10. An image coding apparatus of claim 6, wherein an arbitrary sequence of pictures located in time between the picture to be coded and the reference picture is a forward picture sequence, and a sequence of blocks of the forward picture sequence in a same position as the block to be coded in the picture to be coded is a forward block sequence, the means for detecting the block to coded as an independent block comprises:
   activity measuring means for measuring an activity of pixel level in the block to be coded;
   first comparison means for comparing an activity of the block to be coded as the output of the activity measuring means with a first specific value;
   second comparison means for comparing an activity of pixel level in each block of the forward block sequence as the output of the activity measuring means with a second specific value; and
   means for determining the block to be coded to be an independent block, when the activity of the block to be coded is detected to be smaller than the first specific value by the first comparison means, and the activity of at least one block in the forward block row is detected to be greater than the second specific value by the second comparison means.

* * * * *